US006605923B1

United States Patent
Kellogg

(10) Patent No.: US 6,605,923 B1
(45) Date of Patent: Aug. 12, 2003

(54) UNINTERRUPTED POWER SUPPLY

(75) Inventor: Norman D. Kellogg, Huntington Beach, CA (US)

(73) Assignee: Aspen Electronics Corporation, Shelton, CT (US)

(*) Notice: Subject to any disclaimer, the term of this patent is extended or adjusted under 35 U.S.C. 154(b) by 0 days.

(21) Appl. No.: 10/280,381

(22) Filed: Oct. 25, 2002

(51) Int. Cl.[7] ................................. H02J 7/00

(52) U.S. Cl. ........................ 320/112; 320/110

(58) Field of Search .................. 320/112, 110, 320/116, 107, 114; 429/96, 97, 98, 99, 100

(56) References Cited

U.S. PATENT DOCUMENTS 5,592,064 A * 1/1997 Morita ........................ 320/112
5,626,979 A * 5/1997 Mitsui et al. ................. 429/99

* cited by examiner

Primary Examiner—Lawrence Luk
(74) Attorney, Agent, or Firm—Drummond & Duckworth

(57) ABSTRACT

An improved power source is provided incorporating a main battery pack and reserve battery pack. Both the main battery pack and reserve battery pack include rechargeable power sources and electrical power terminals. In addition, the power source includes a first mount for affixing the main battery pack to the reserve battery pack so that the respective power terminals engage and become electrically coupled. Moreover, the reserve battery pack includes an additional second set of power terminals for connection to an electrically powered device, such as a video camera. A second mount is provided for affixing the reserve battery pack to the electrically powered device so that the reserve battery pack's second set of power terminals engage electrical terminals of the electrically powered device. A controller is provided for controlling the electrical connection of the main battery pack and reserve battery pack to the electrically powered device. The controller further includes voltage and/or current detectors for detecting voltage and current values of the respective battery packs. Moreover, the controller includes a control processor for controllably providing an electrical connection between the main battery pack and/or reserve battery pack with the electrically powered device based upon predetermined voltage and current parameters. In a preferred embodiment, the main battery pack provides exclusive power the electrically powered device until detection of a current surge wherein the controller causes the battery packs to be connected in parallel to provide power to the electrically powered device. Also preferably, the controller causes power to be switched from the main battery pack to the reserve battery pack when the controller has determined that the main battery pack's charge level has dropped below a predetermined value.

18 Claims, 7 Drawing Sheets

UNINTERRUPTED POWER SUPPLY

BACKGROUND OF THE INVENTION

The present invention relates to power supplies for electronic devices, such as video cameras. More particularly, the present invention relates to the combination of a primary battery pack and detachable reserve battery pack for use with video cameras.

Portable battery products for professional video cameras are designed with three predominant features in mind. These features include: 1) how much does a battery weigh; 2) how long will the camera run with the particular battery; and 3) is the battery reliable under a variety of loads and conditions.

The weight of a camera battery is of extreme importance to professional cameramen as the camera alone weighs between 10 lbs. and 15 lbs. In addition, earlier prior art batteries typically weighed 5 lbs. or more which had a noticeable effect on the overall weight carried by the cameramen. Nonetheless, the early 5 lb. batteries were reliable and provided at least 60 w hours of capacity. Since the power consumption of professional cameras is typically between 20 w and 30 w without activation of a camera light, and between 45 w and 50 w with activation of a camera light, the 5 lb. batteries provided at least an hour of camera operation.

Eventually, advanced lightweight battery chemistries were developed for video camera applications. Unfortunately, most of the chemistries provided high capacity under minimum load conditions which are far below professional video standards. For example, recent lithium ion batteries are susceptible to routine current surges which occur such as when the camera light is activated. For example, a 25 w camera lamp can initially draw up to 100 w for a few milliseconds.

Lithium ion batteries often cannot handle this current surge resulting in the lithium ion battery surge protector disabling the battery, and thereby freezing the camera. To reactivate the battery, the battery is typically removed and then reinstalled. Thus, while recent battery chemistries can provide improved watt hour capacity, the battery chemistries often times can not produce the surge current capabilities required. Unfortunately, this has resulted in batteries being branded as unreliable. With reference to FIG. 1, professional cameramen have attempted to overcome this disadvantage by wiring two batteries in parallel, thereby spreading the load over two batteries rather than one. To this end, a first battery is mounted to the camera in typical manner. A second battery, often located on the cameraman's belt, is then connected in parallel to the first battery by wires.

Unfortunately, though producing longer camera run times, this solution presents several additional disadvantages. First, the positioning and wiring of a second battery can be difficult and annoying. Furthermore, providing two batteries in parallel has produced unreliable behavior as the batteries should be of equal capacity. In addition, the batteries need to be electrically isolated from charging each other. Moreover, reliability becomes of greater concern when simultaneously using two batteries, rather than one.

Various additional attempts have been developed for providing more reliable and expandable power supplies. For example, the combination of a primary battery and auxiliary battery has been used for some time in connection with laptop computers. As described in U.S. Pat. No. 5,347,163, such systems typically include a voltage detection circuit which detects the voltage of the primary battery, and the system switches power from the primary battery to the auxiliary battery when the detected voltage falls below a predetermined threshold. Unfortunately, such systems will not protect against current surges, such as caused by the activation of a camera light. Moreover, the combination of a primary battery and auxiliary battery are typically used in cooperation with electrical devices, such as laptop computers, which include constructions specifically designed to accept two batteries. Conventional video cameras are not constructed to accept two batteries.

Meanwhile, U.S. Pat. No. 4,816,862 describes a power supply system for a camera. The power supply system includes a main battery and a back-up battery. When the main battery is removed, the back-up battery supplies power to the camera's micro computer so that the computer's processor and internal memory is maintained in a properly operating condition after the main battery has been removed. However, once the main battery has been removed or discharged, the camera's flash circuit and motor circuit are disabled so that the camera is inoperable.

Similarly, U.S. Pat. No. 5,164,761 describes a battery system for a handheld camera. The battery system includes a primary non-rechargeable battery, and a rechargeable secondary battery. When the primary battery is discharged, a switch is activated to switch power from the primary battery to the secondary battery. Again, the system does not provide for protection against current surges.

In addition, U.S. Pat. No. 6,289,179 discloses a power system for handheld cameras. The power system includes a structure for stacking any number of batteries and for connecting such batteries in parallel. However, the power system does not provide a reserve power supply so that the camera can still be utilized when the batteries are replaced after discharge.

There is thus a significant need for an improved power supply for electrical devices, such as video cameras.

In addition, it would be advantageous that the power supply provide power to an electrical device when the primary battery was being replaced.

In addition, it would highly advantageous if the power supply included a primary battery pack which charges a reserve battery pack so that the reserve battery pack need not be removed for charging.

Furthermore, it would be highly advantageous if the improved power supply could be used in cooperation with electrical devices which are not initially designed to accept two battery packs, but instead utilize only a single primary battery pack.

SUMMARY OF THE INVENTION

Briefly, in accordance with the invention, I provide an improved power supply for electrically powered devices, which is particularly suitable for professional video cameras. The power supply includes a main battery pack and reserve battery pack. Moreover, the combination of a main battery pack and reserve battery pack are constructed to connect to a device initially constructed to use only a single primary battery pack. To this end, the reserve battery pack includes first and second mounting surfaces, and first and second sets of power terminals. The main battery pack includes a pair of electrical power terminals, and the main battery pack attaches to the reserve battery pack by means of a first mount. The first mount is constructed to detachably affix the main battery pack to the reserve battery pack with the main battery pack's electrical power terminals engaging and electrically coupling to the reserve pack's first set of power terminals.

Meanwhile, the reserve battery pack's second mount is constructed to attach and engage to the electrical powered device's mounting structure with the reserve pack's second set power terminals engaging the electrical powered device's electrical terminals so that charge within the reserve pack can be provided to the electrically powered device. The mounting structures for coupling the main battery pack to the reserve battery pack, and for coupling the reserve battery pack to the electrically powered device, may take various forms as can be determined by those skilled in the art. However, in a preferred embodiment, the first and second mount constructions permit the main battery pack to affix to the reserve battery pack with the main battery pack's terminals engaging the reserve pack's first terminals, and alternatively permit the main battery pack to connect directly to the electrically powered device's power terminals so that the electrically powered device may be operated with, or without, using the reserve battery pack.

The power supply of the present invention further includes a controller for controlling the electrical connection of the main battery pack and reserve battery pack to the electrically powered device. To this end, the controller includes a detector for detecting the voltage of the main battery pack and reserve battery pack, and for detecting current draw from the electrically powered device. In addition, the controller includes a processor and a plurality of switches for controlling the electrical connection of the main battery pack and the reserve battery pack with the electrically powered device.

In operation, the controller selectively connects only the main battery pack to the electrically powered device, or electrically connects only the reserve battery pack to the electrically powered device, or electrically connects the main battery pack and reserve battery pack in parallel to provide power to the electrically powered device. The respective electrical connection is determined based upon predetermined charge and current parameters. For example, where the main battery pack and reserve battery pack are fully charged, the controller preferably actuates the switches so that the main battery pack alone provides power to the electrically powered device. However, if the electrically powered device initiates a current surge, detected by the detector, the control processor causes the main battery pack and reserve battery pack to be connected in parallel. Thereafter, the main battery pack and reserve battery pack are caused to remain connected in parallel until a predetermined time period has passed, such as one second, or until the current surge has dissipated below a predetermined level.

Moreover, the control processor also selectively switches power from the main battery pack to the reserve battery pack when the main battery pack charge has dissipated below a predetermined level. The determination of the main battery pack's charge may be determined by numerous means known to those skilled in the art including using voltage and/or current measurements of the main battery. For example, a 12 v battery may exhibit a 15 v measurement when full, but an 11 v measurement when close to empty. Thus, in practicing the present invention, the control processor may selectively switch power from a 12 v main battery pack to the reserve battery pack when the voltage of the main battery pack drops below 11 v.

The controller may be located within the main battery pack housing, within the reserve battery pack housing, or even within the electrically powered device. Preferably, the controller is connected to a battery gauge for displaying the remaining charge of either the main battery pack or reserve battery pack. Furthermore, preferably the controller is connected to a manual switch to allow a person to manually switch from power being supplied from the main battery pack to power being supplied from the reserve battery pack. This manual switch is useful in case the operator wishes to disengage the main battery pack from the reserve battery pack, prior to the main battery pack reaching an empty condition. Thus, the main battery pack can be removed, and replaced or recharged, while the reserve pack provides uninterrupted power to the electrically powered device.

In a preferred embodiment of the invention, the main battery pack also provides for recharging of the reserve battery pack. For this embodiment of the invention, the main processor's detector detects the charge level of the reserve pack. Upon determination by the controller that the reserve pack has a diminished charge and determination that the main battery pack has sufficient charge for recharging the reserve pack, the controller electrically couples the main battery pack to the reserve battery pack so as to recharge the reserve battery pack.

It is thus an object of the present invention to provide a power supply for electrically powered devices, and particularly for professional video cameras, which is not susceptible to problems caused by current surges.

It is also an object of the present invention to provide a power supply including both a primary battery pack and a disengageable reserve battery pack which can be connected to an electrically powered device initially constructed to connect only to a single primary battery pack.

Moreover, it is an object of the present invention to provide a power supply which provides uninterrupted power to an electrically powered device even after the main battery pack or reserve battery pack have been removed for replacement or recharging.

Furthermore, it is an object of the present invention to provide a power supply wherein the reserve battery pack can be recharged while still connected to the electrically powered device by the main battery pack.

These and other more specific objects and advantages of the invention will be apparent to those skilled in the art from the following detailed description taken in conjunction with the drawings.

DETAILED DESCRIPTION OF THE INVENTION

Figure 1:
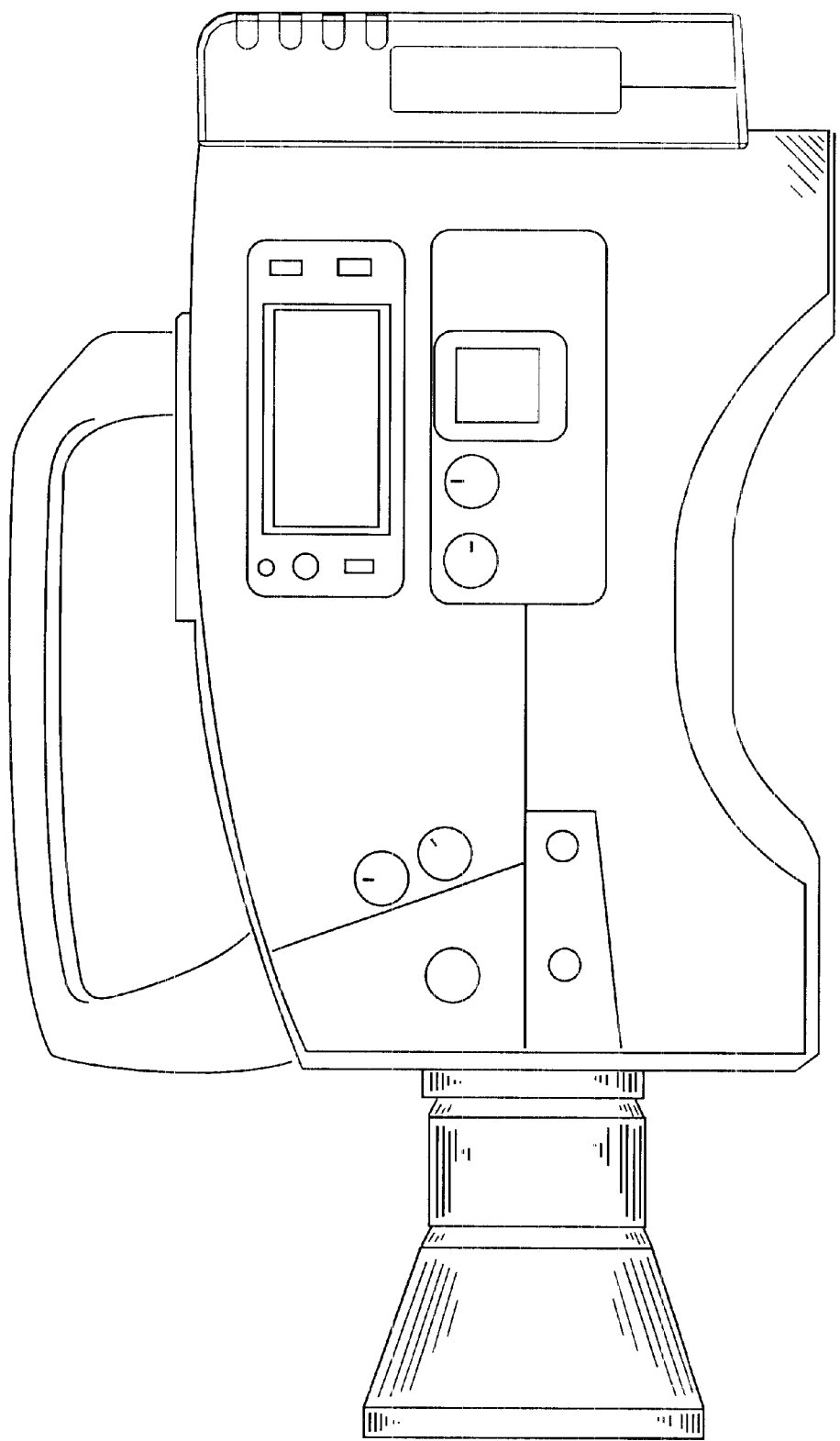
FIG. 1 is a left side view of a prior art video camera and primary battery combination.
Figure 2:
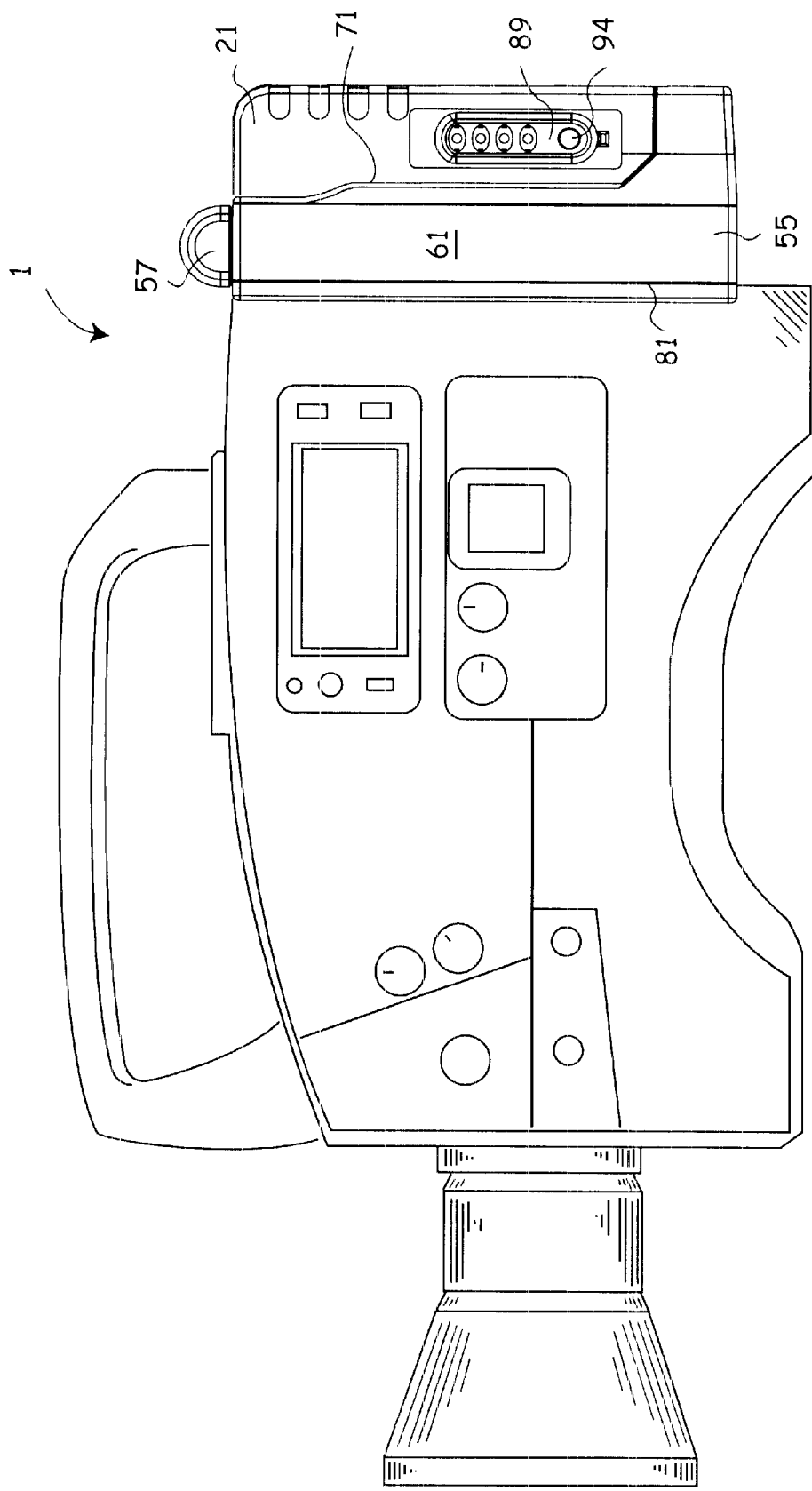
FIG. 2 is a left side view of a video camera incorporating a power supply of the present invention.

While the present invention is susceptible of embodiment in various forms, as shown in the drawings, hereinafter will be described the presently preferred embodiments of the invention with the understanding that the present disclosure is to be considered as an exemplification of the invention and it is not intended to limit the invention to the specific embodiments illustrated.

With reference to the figures, the present invention is directed to an improved rechargeable power supply for electronic devices in general, but which is described herein for use with video cameras. The power source 1 of the present invention is constructed to affix to the rear 5 of a video camera 3. The power supply 1 includes a main battery pack 21 and a reserve battery pack 55. The main and reserve battery pack combination is constructed to replace a single conventional primary battery pack attached to the rear of a video camera. (See FIG. 1)

To this end, the power supply combination 1 includes a first mount 49 for mounting the main battery pack 21 to the reserve battery pack 55, and a second mount 81 for mounting the reserve battery pack to the camera 3. The mounting structure for coupling the main battery pack to the reserve battery pack, and for coupling the reserve battery pack to the camera may take various forms as can be determined by those skilled in the art. For example, the second mounting structure 81 for mounting the reserve battery pack to the camera may include simple threaded fasteners. However, v-lock, pin and slot, and alternative fasteners may also be used without departing from the scope of the invention.

With reference to FIGS. 3–6, in a preferred embodiment, the main battery pack 21 affixes to the reserve battery pack 55 by constructing the reserve battery pack to include a holster configuration 61. The holster 61 includes a main battery recess 62 for receiving the bottom 24 of the main battery pack 21. To keep the main battery pack 21 from inadvertently being removed from the holster 61 due to jarring or other manipulation of the camera, the holster 61 includes a pair of dogs 73 sized and configured to be received within dog houses 39 formed on the rear surface 25 of the main battery pack 21. Preferably, the dogs 73 and/or dog housings 39 include magnets which cause the dog housings and dogs to magnetically attract to further restrict removal of the main battery 21 from the reserve battery pack's holster 61. Also, preferably, the holster further includes a tongue 77 sized and configured to slide into a retaining slot 43 which is also formed on the rear surface 25 of the main battery pack 21.

To install the main battery pack 21 into the holster 61, the main battery pack is manipulated so that the bottom 24 of the main battery pack is slid downwardly into the holster's main battery recess 62. The holster's tongue 77 is concurrently forced upwardly into the main battery pack's retaining slot 43. Once engaged to the holster 61, the main battery's electrical terminals 45 are positioned to engage and electrically couple to electrical terminals 65 located in the holster's main battery recess 62. The electrical terminals include positive and negative power terminals, and may include one or more signal terminals for communicating voltage or current indications.

Figure 3:
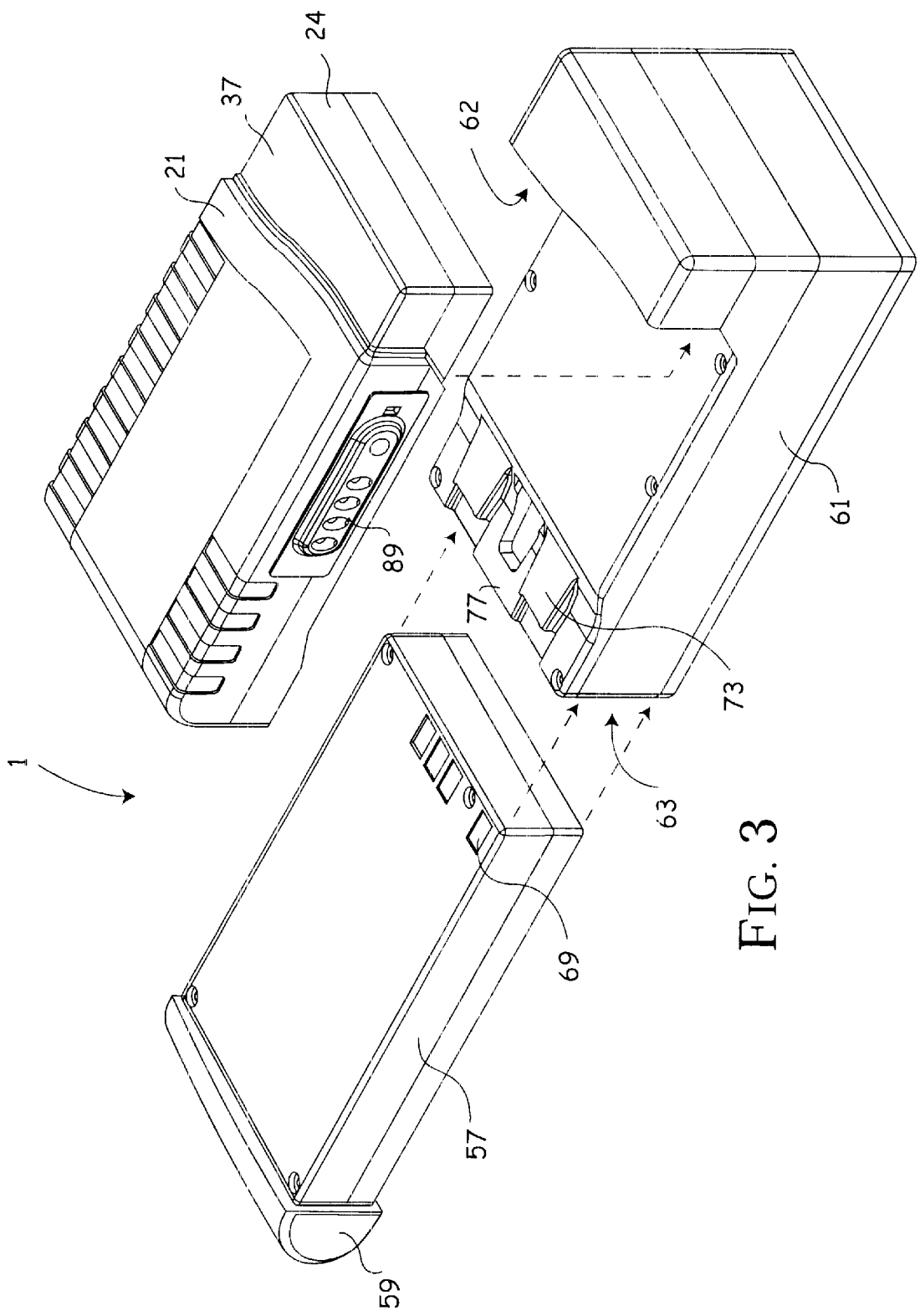
FIG. 3 is an exploded perspective view of the power supply of the present invention.
Figure 5:
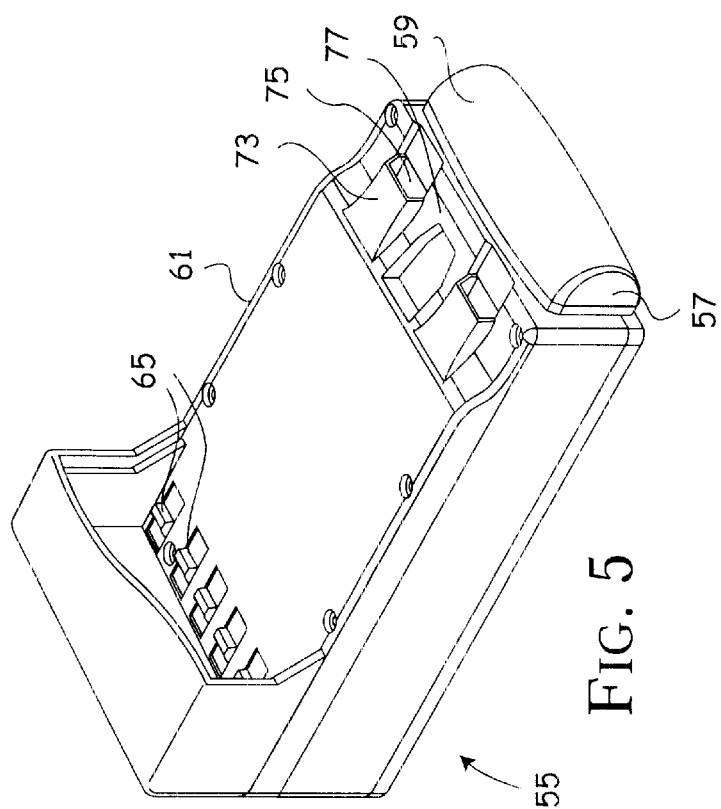
FIG. 5 is a second perspective view of the reserve battery pack of the present invention.
Figure 4:
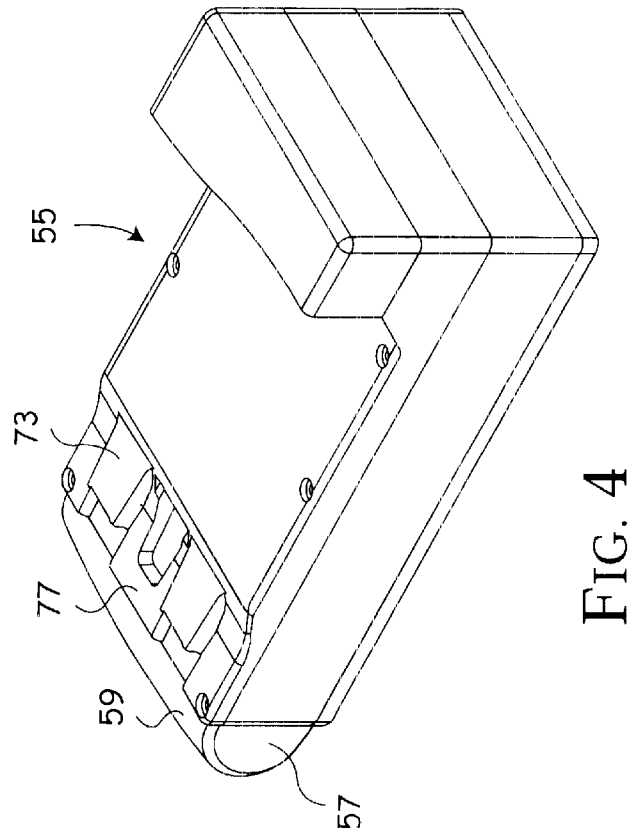
FIG. 4 is a first perspective view of a preferred reserve battery pack of the present invention.
Figure 6:
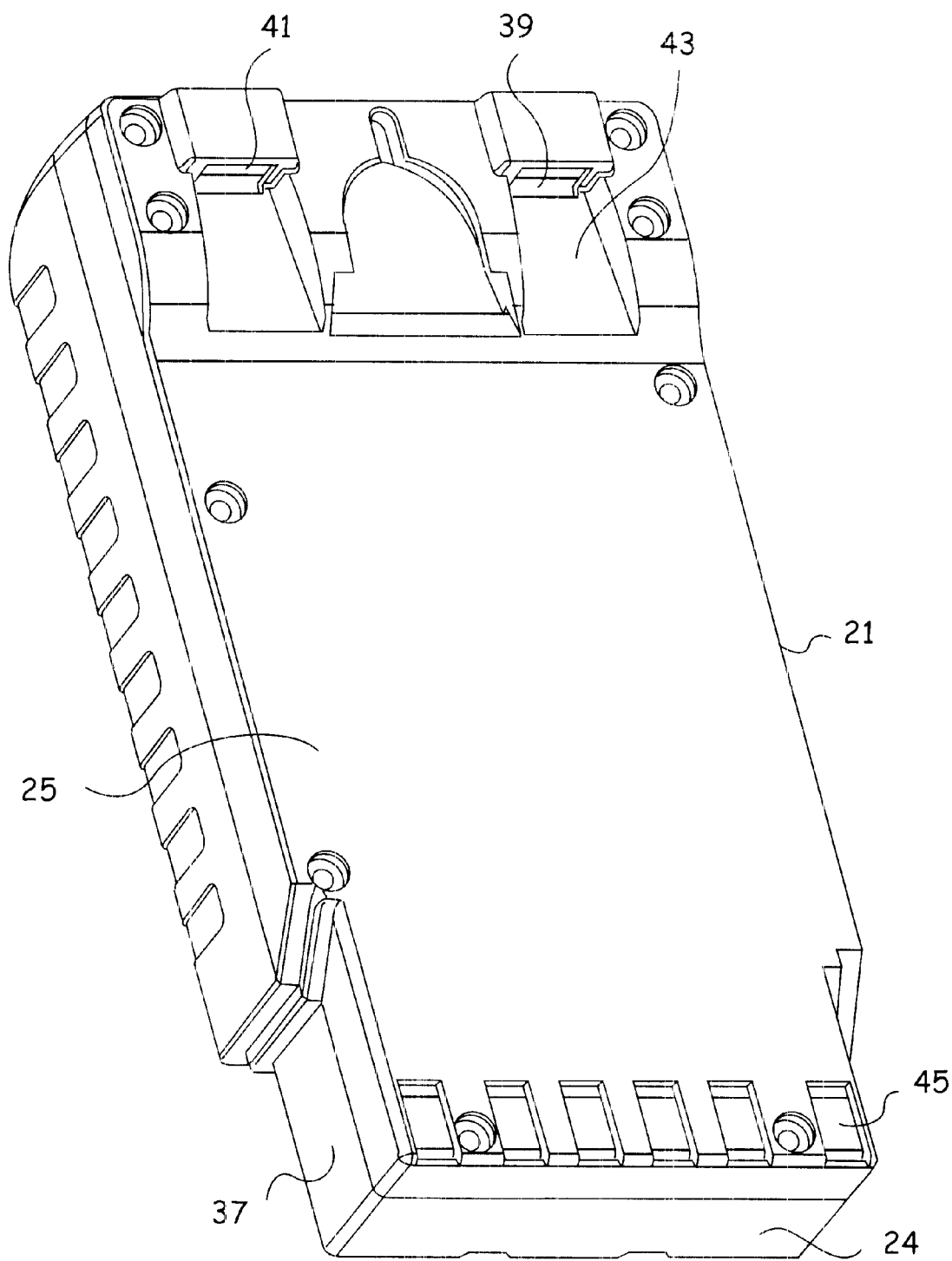
FIG. 6 is a perspective view illustrating a main battery pack of the present invention.

Preferably, the reserve battery pack 55 is constructed so that its rechargeable power source 57 can be replaced and removed from the holster 61 while the holster 61 stays affixed to the rear of the camera 3, and while the holster 61 retains a main battery pack 21 within the holster's main battery recess 62. For example, as shown in FIG. 3, the holster 61 includes a reserve battery recess 63 extending vertically substantially the length of the holster. The reserve battery pack's rechargeable power source 57 is mated to the holster 61 by simply inserting the power source into the recess until the power source's power terminals 69 engage electrical terminals (not shown) located within the holster's reserve battery recess. To remove the rechargeable power source 57, one merely pulls upwardly upon the rechargeable power source's semi-cylindrical top 59. Alternatively, the holster 61 is provided with a spring ejection feature (not shown) such that operators of the camera can simply press downwardly upon the top of reserve battery pack's rechargeable power source and thereafter release pressure to thereby cause the power source to spring upwardly so as to be removed from the holster. Spring ejection constructions are known to those skilled in the art and such features are not described further herein.

Figure 7:
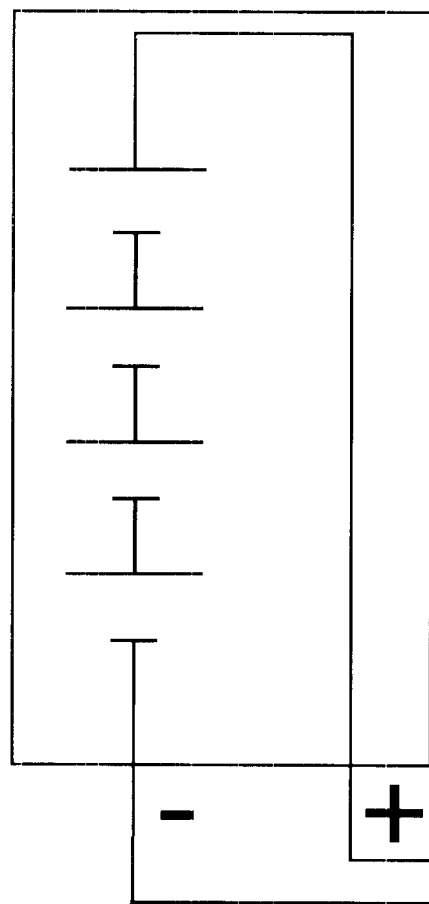
FIG. 7 is a electronic diagram describing the connection of a power source of the prior art.
Figure 7:
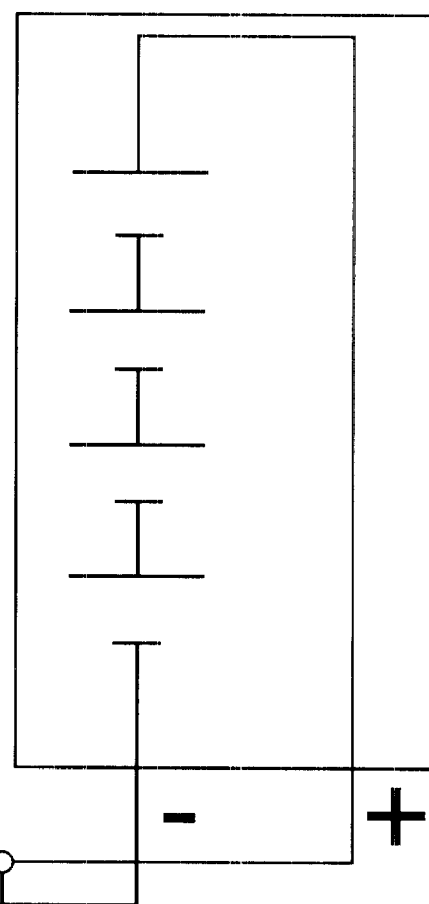
Figure 7:
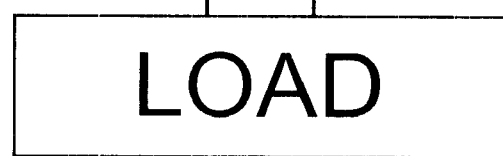
Figure 8:
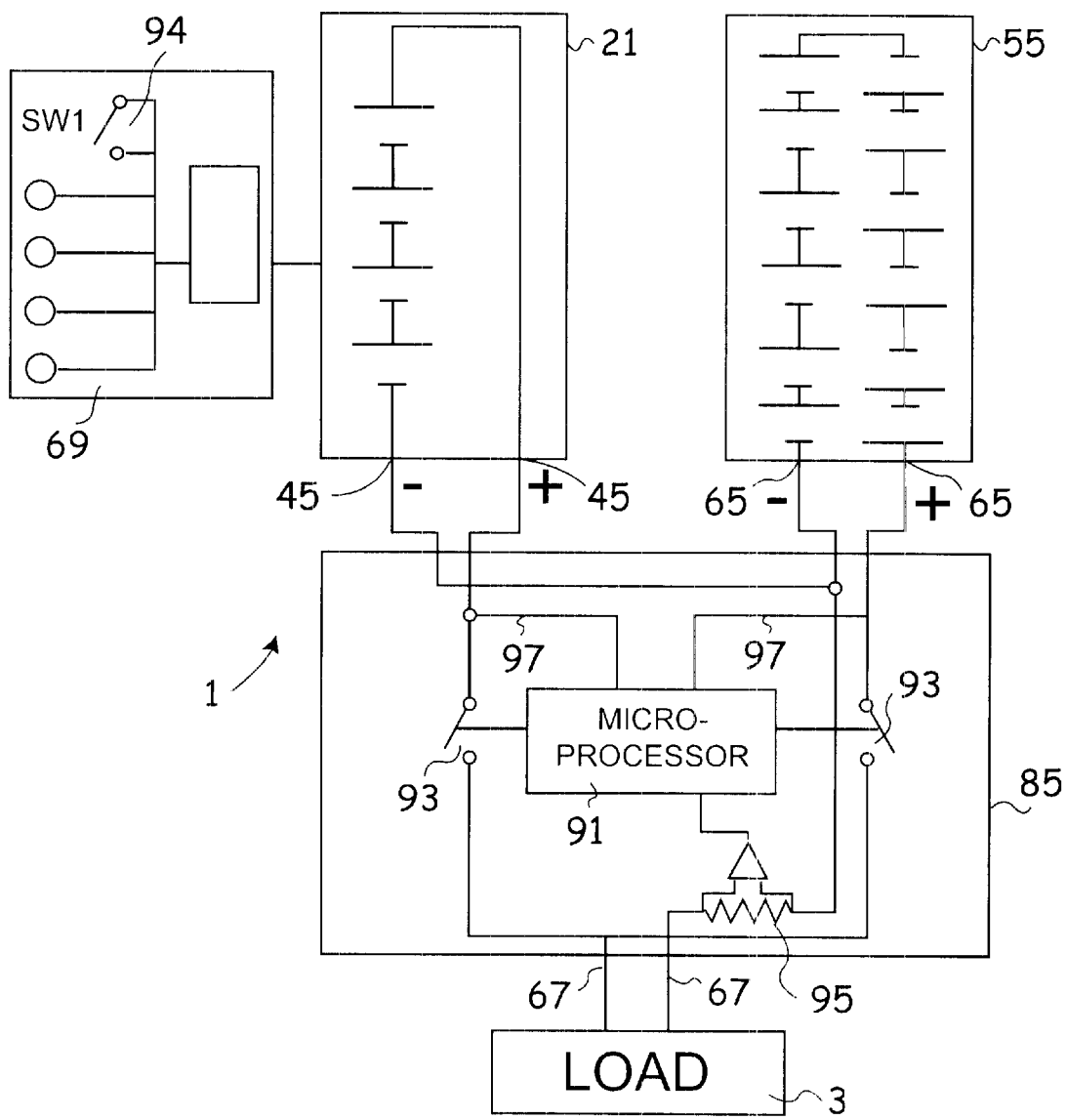
FIG. 8 is an electronic diagram illustrating the electrical connection of the power supply of the present invention.

As shown in FIG. 7, prior art power sources often included a main battery pack and reserve battery pack wired in parallel to supply power to an electrically powered device, such as a camera. Meanwhile, with reference to FIG. 8, the power source 1 of the present invention includes a controller 85 for selectively connecting the main battery pack 21 to the camera 3 for providing power from the main battery pack to the camera 3, or alternatively for connecting the reserve battery pack to the camera for supplying power from the reserve battery pack 55 to the camera 3, or alternatively for connecting the main battery pack 21 and reserve battery pack 55 in parallel to supply power to the camera 3. To this end, the controller 85 includes current detectors 95 and voltage detectors 97 for determining the voltage of the respective batteries, and for determining current drain from the camera. Moreover, the controller 85 includes a processor 91 and a plurality of switches 93 connected to the processor for selectively connecting the main battery pack 21 and/or reserve battery pack 55 to the camera 3 based upon predetermined voltage and current parameters. Circuitry and processors for detecting voltage and current parameters and for controlling the operation of electrical switches can be selected and determined by those skilled in the art. The controller, including processor, switches, and current and voltage detectors, may be positioned within the main battery pack housing, reserve battery pack housing, or within the camera itself. However, it is preferred that the controller be positioned within the main battery housing.

Preferably, the power supply 1 of the present invention further includes a user interface 89. The user interface 89 preferably includes a charge indicator 99, such as a plurality of LEDs which light up sequentially depending upon the amount of charge within the battery. Preferably, the charge indicator 99 is connected to one or more buttons or switches for allowing an operator to selectively determine the charge of either the main battery pack or the reserve battery pack. Moreover, preferably the user interface 89 includes one or more manual buttons or switches connected to the controller which allow an operator to manually and selectively control the electrical connection of the main battery pack and reserve battery pack to the camera.

To use the power source of the present invention, the rechargeable power sources of the main battery pack 21 and reserve battery pack 55 are charged using a conventional charger. Once charged, the main battery pack 21 is positioned to engage the reserve battery pack 55 by inserting the main battery pack into the holster's main battery recess 62 so that respective power and signal terminals engage. Further, the reserve battery pack 55 is mounted to the rear 5 of the camera 3 so that reserve battery pack electrical terminals engage the camera's electrical terminals.

The controller 85 of the present invention automatically controls electrical connection of the main battery pack 21 and reserve battery pack 55 to the camera. Preferably, where both the main battery pack and reserve battery pack are fully charged, the control processor 91 activates the switches 93 so that the main battery pack alone provides power to the camera. Meanwhile, if the controller detects that the camera 3 has initiated a current surge, such as by activation of a camera lamp, the control processor 91 causes the switches to actuate in a manner that places the main battery pack and reserve battery pack electrically in parallel to supply power to the camera. Preferably, the main battery pack and reserve battery pack are caused to remain connected in parallel until the current surge has passed, or until a predetermined time period has passed.

Advantageously, the main battery pack 21 can be removed for recharging or replacement while the reserve battery pack 55 is supplying power to the camera 3. Once main battery charge has dissipated below a predetermined level, the controller 85 switches power from the main battery pack to the reserve battery pack by selective manipulation of switches 93. Thereafter, the main battery pack can be removed, and recharged or replaced, while the reserve battery pack supplies power to the camera.

Preferably, the controller 85 includes a manual switch 93 for allowing an operator to manually elect which battery pack supplies power to the camera. This feature is advantageous where a camera operator wishes to recharge or replace the main battery pack, even though the main battery pack's charge has not dropped to a level that causes the controller to switch from the main battery pack to the reserve battery pack. The operator manipulates the manual switch to cause the controller to switch power from the main battery pack to the reserve battery pack so that a current spike does not damage the camera when the main battery pack is being removed.

Preferably, the power source 1 of the present invention also provides for the main battery pack 21 charging the reserve battery pack 55. In particular, upon determination by the controller that the charge of the reserve battery pack has dissipated below a predetermined level, the controller causes the main battery pack to be connected to the reserve battery pack so as to charge the reserve battery pack's rechargeable power source 57. Thus, the reserve battery pack 55 can be recharged without ever removing its rechargeable power source 57 from the holster 61, thereby allowing the reserve battery pack to be semi-permanently affixed to the back of the camera as it need not be removed from the back of the camera once installed. Alternatively, the reserve battery pack's power supply 57 can be removed from the holster 61 for recharging while the main battery pack supplies power to the camera.

Accordingly, the power source of the present invention provides uninterrupted power to the camera by providing controllable substitution of power from the main battery pack or reserve battery pack while the alternative pack is being recharged or replaced.

Many changes may be made without departing from the spirit of the present invention. For example, the chemistries of the rechargeable power sources may be any of those skilled in the art, including but not limited to nickel cadmium or lithium ion. Furthermore, though the power source of the present invention is believed to have particular application for use with video cameras, the power source can be used in cooperation with other electrical devices. Thus, the invention may be embodied in still other forms and for other applications without departing from the essential characteristics of the invention.

Having described my invention in such terms to enable those skilled in the art to make and use it, and having identified the presently preferred embodiments thereof, I claim:

1. A main battery pack and reserve battery pack combination for supplying power to an electrically powered device, the battery pack combination comprising:

a first battery pack including a first rechargeable power source and pair of electrical power terminals;

a second battery pack including a second rechargeable power source, a first set of power terminals and a second set of power terminals;

a mounting means for mounting said first battery pack and a second battery pack to an electrically powered device, said mounting means including;

a first mount for detachably mounting said first battery pack to said second battery pack such that said first battery pack's electrical power terminals are electrically connected to said second battery pack's first set of power terminals; and a second mount for mounting said second battery pack to an electrically powered device;

a control means for electrically connecting said first battery pack to an electrically powered device, for electrically connecting said second battery pack to an electrically powered device, or for electrically connecting said first battery pack and said second battery pack in parallel to an electrically powered device; said control means including, a detector for determining voltage parameters of said first battery pack and said second batter pack, one or more switches for controlling the supply of power of said first battery pack with the electrically powered device and for controlling the supply of power of said second battery pack with the electrically powered device, and a control processor controlling said switches for automatically connecting said first battery pack or said second battery pack or said first battery pack and said second battery pack to the electrically powered device based upon the predetermined voltage parameters.

2. The battery pack combination of claim 1 wherein said predetermined voltage parameters include switching from said first battery pack to said second battery pack for supplying power to the electrically powered device based upon detection that said first battery pack's voltage having dropped below a predetermined voltage value.

3. The battery pack combination of claim 2 wherein said predetermined voltage parameters include switching from said first battery pack to said second battery pack for supplying power to the electrically powered device based upon detection that said first battery pack's voltage has increased above a predetermined voltage value.

4. The battery pack combination of claim 1 further comprising a manual switch connected to said control processor, said manual switch operative to initiate said processor to switch from said first battery pack supplying power to the electrically powered device to said second battery pack supplying power to the electrically powered device.

5. The battery pack combination of claim 1 further comprising a manual switch connected to said control processor, said manual switch operative to initiate processor to switch from said first battery pack supplying power to the electrically powered device to an electrically parallel mode in which said first battery pack and said second battery pack supply power in parallel to the electrically powered device.

6. The battery pack combination of claim 1 wherein said detector detects the voltage level of said second pack and said first battery pack charges said second battery pack upon detection that said second battery pack's voltage has dropped below a predetermined voltage value.

7. The battery pack combination of claim 1 wherein said second battery pack includes a holster detachably securing said second rechargeable power source so that said second rechargeable power source can be removed from said second battery pack.

8. A main battery pack and reserve battery pack combination for supplying power to an electrically powered device, the battery pack combination comprising:

a first battery pack including a first rechargeable power source and pair of electrical power terminals;

a second battery pack including a second rechargeable power source, a first set of power terminals and a second set of power terminals;

a mounting means for mounting said first battery pack and a second battery pack to an electrically powered device, said mounting means including;

first mount for detachably mounting said first battery pack to said second battery pack such that said first battery pack's electrical power terminals are electrically connected to said second battery pack's first set of power terminals; and a second mount for mounting said second battery pack to an electrically powered device; and a control means for electrically connecting said first battery pack to an electrically powered device, for electrically connecting said second battery pack to an electrically powered device, or for electrically connecting said first battery pack and said second battery pack in parallel to an electrically powered device; said control means including;

a detector for determining current parameters of said first battery pack and said second batter pack, one or more switches for controlling the supply of power of said first battery pack with the electrically powered device and for controlling the supply of power of said second battery pack with the electrically powered device, and a control processor controlling said switches for automatically connecting said first battery pack or said second battery pack or said first and second battery packs in parallel to the electrically powered device based upon the predetermined current parameters.

9. The battery pack combination of claim 8 wherein said predetermined current parameters include connecting said first and second battery packs in parallel to supply power to the electrically powered device based upon detection of current draw from the electrically powered device being greater than a predetermined current value.

10. The battery pack combination of claim 9 wherein said predetermined current parameters include disconnecting said first and second battery packs from parallel so that said first battery supplies power to the electrically powered device based upon detection of current draw from the electrically powered device being lesser than a predetermined current value.

11. The battery pack combination of claim 8 wherein said predetermined current parameters include disconnecting said first and second battery packs from parallel so that said first battery supplies power to the electrically powered device based upon a predetermined time period passing since the battery packs were placed in parallel.

12. The battery pack combination of claim 8 further comprising a manual switch connected to said control processor, said manual switch operative to initiate processor to switch from said first battery pack supplying power to the electrically powered device to said second battery pack supplying power to the electrically powered device.

13. The battery pack combination of claim 8 further comprising a manual switch connected to said control processor, said manual switch operative to initiate processor to switch from said first battery pack supplying power to the electrically powered device to parallel mode in which said first battery pack and said second battery pack supply power in parallel to the electrically powered device.

14. The battery pack combination of claim 8 wherein said detector detects the voltage level of said second pack and said first battery pack charges said second battery pack upon detection that said second battery pack's voltage has dropped below a predetermined voltage value.

15. The battery pack combination of claim 8 wherein said second battery pack includes a holster detachably securing said second rechargeable power source so that said second rechargeable power source can be removed from said second battery pack.

16. A main battery pack and reserve battery pack combination for supplying power to an electrically powered device, the battery pack combination comprising:

a first battery pack including a first rechargeable power source and pair of electrical power terminals;

a second battery pack including a second rechargeable power source, a first set of power terminals and a second set of power terminals;

a control means for electrically connecting said first battery pack to an electrically powered device or for electrically connecting said first battery pack and said second battery pack in parallel to an electrically powered device; said control means including, a detector for determining current parameters of said first battery pack, one or more switches for controlling the supply of power of said first battery pack with the electrically powered device and for controlling the supply of power of said second battery pack with the electrically powered device, and a control processor controlling said switches for automatically connecting said first battery pack and said second battery pack in parallel to the electrically powered device based upon detection of current draw from the electrically powered device being greater than a predetermined current value.

17. A main battery pack and reserve battery pack combination for supplying power to an electrically powered device, the battery pack combination comprising:

a first battery pack including a first rechargeable power source and pair of electrical power terminals;

a second battery pack including a second rechargeable power source, a first set of power terminals and a second set of power terminals;

a mounting means for mounting said first battery pack and a second battery pack to an electrically powered device, said mounting means including;

a first mount for detachably mounting said first battery pack to said second battery pack with said first battery pack's electrical power terminals electrically connected to said second battery pack's first set of power terminals; and a second mount for mounting said second battery pack to an electrically powered device;

a control means for electrically connecting said first battery pack to an electrically powered device or for electrically connecting said second battery pack to an electrically powered device; and a manual switch connected to said control means for causing said control means to selectively electrically connect said first battery pack to an electrically powered device or electrically connect said second battery pack to an electrically powered device, said control means switching from said first battery pack to said second battery pack wherein said battery packs are momentarily connected in parallel to supply power to said electrically powered device prior to electrically disconnecting said first battery pack from said electrically powered device.

18. A main battery pack and reserve battery pack combination for supplying power to an electrically powered device, the battery pack combination comprising:

a first battery pack including a first rechargeable power source and pair of electrical power terminals;

a second battery pack including a second rechargeable power source, a first set of power terminals and a second set of power terminals;

a mounting means for mounting said first battery pack and a second battery pack to an electrically powered device, said mounting means including;

a first mount for detachably mounting said first battery pack to said second battery pack with said first battery pack's electrical power terminals electrically connected to said second battery pack's first set of power terminals; and a second mount for mounting said second battery pack to an electrically powered device;

a control means for electrically connecting said first battery pack to an electrically powered device or for electrically connecting said second battery pack to an electrically powered device; and a manual switch connected to said control means for causing said control means to select a continuous parallel mode in which said first battery pack and said second battery pack supply power in parallel to the electrically powered device, said control means switching from said first battery pack to said second battery pack wherein said battery packs are momentarily connected in parallel to supply power to said electrically powered device prior to electrically disconnecting said first battery pack from said electrically powered device.

* * * * *